US010753400B2

(12) United States Patent
Duffy

(10) Patent No.: US 10,753,400 B2
(45) Date of Patent: Aug. 25, 2020

(54) BALL BEARING WITH LUBRICANT DRAIN

(71) Applicant: United Technologies Corporation, Farmington, CT (US)

(72) Inventor: Kevin Duffy, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/138,318

(22) Filed: Sep. 21, 2018

(65) Prior Publication Data

US 2020/0096045 A1 Mar. 26, 2020

(51) Int. Cl.
*F16C 33/66* (2006.01)
*F16C 19/06* (2006.01)

(52) U.S. Cl.
CPC .......... *F16C 33/6685* (2013.01); *F16C 19/06* (2013.01); *F16C 2360/23* (2013.01)

(58) Field of Classification Search
CPC .............. F16C 33/6659; F16C 33/6681; F16C 33/6685; F16C 2360/23
See application file for complete search history.

(56) References Cited

U.S. PATENT DOCUMENTS

| 2,280,659 | A | * | 4/1942 | Muller ................ F16C 33/6659 384/475 |
| 5,711,615 | A | | 1/1998 | Stitz |
| 5,749,660 | A | | 5/1998 | Dusserre-Telmon et al. |
| 6,837,623 | B2 | | 1/2005 | Shirokoshi et al. |
| 7,384,197 | B2 | | 6/2008 | Plona |
| 8,562,224 | B2 | * | 10/2013 | Duffy ................ F16C 33/6677 384/475 |
| 9,841,056 | B2 | | 12/2017 | Snow et al. |
| 2013/0336608 | A1 | | 12/2013 | Miller et al. |
| 2017/0234367 | A1 | * | 8/2017 | Yoshino .................. F16N 7/32 384/467 |
| 2018/0320550 | A1 | * | 11/2018 | Kenney .................. F01D 25/16 |
| 2019/0170187 | A1 | | 6/2019 | Matsunaga |

FOREIGN PATENT DOCUMENTS

| EP | 1541884 | * | 6/2015 |
| FR | 3056656 | | 3/2018 |
| JP | 2002021962 A | | 1/2002 |

OTHER PUBLICATIONS

EP search report for EP19199062.1 dated Feb. 10, 2020.

* cited by examiner

*Primary Examiner* — James Pilkington
(74) *Attorney, Agent, or Firm* — Getz Balich LLC

(57) ABSTRACT

A bearing assembly having an axially extending axis of rotation is provided having an inner ring, an outer ring, and a plurality of bearing elements. The plurality of bearing elements are disposed between the inner ring and the outer ring. The outer ring includes an outer radial surface, an inner radial surface, and a raceway disposed in the inner radial surface. The raceway is defined by a first surface and a second surface, and the first surface intersects with the second surface at a point aft of an axial midpoint of the raceway. The outer ring includes a plurality of apertures that provide a fluid passage between the raceway and an exterior surface of the outer ring. A first end of each of the plurality of apertures is substantially aligned with the intersection of the first surface and the second surface.

15 Claims, 6 Drawing Sheets

BALL BEARING WITH LUBRICANT DRAIN

BACKGROUND OF THE INVENTION

1. Technical Field

This disclosure relates generally to ball bearings, and to ball bearings with a lubricant drain in particular.

2. Background Information

Ball bearings are frequently used in gas turbine engines to accommodate radial and axial loads between a stationary element and a rotating element, but may also be used between two rotating elements. A ball bearing typically includes an inner ring, an outer ring, a plurality of spherical rollers (sometimes referred to as "balls") disposed between the inner and outer ring, and often also includes a cage that spaces the balls around the circumference of the bearing. Ball bearings almost always require some type of lubricant disposed relative to the balls to reduce friction losses. In gas turbine engine applications, a lubrication system may be configured to provide a fluid lubricant (hereinafter referred to as "oil") to the ball bearing. As stated above, the oil operates to reduce frictional loses, but also operates as a cooling medium. The lubrication system cycles the oil to the bearing, subsequently recovers the oil (e.g., via a scavenging system portion of the lubrication system), and may subsequently pass the oil through a heat exchanger to remove thermal energy from the oil and a filtration system to remove contaminants. The lubrication system may then repeat the cycle with the now cooled and filtered oil.

Thermal energy can be produced within the bearing during operation by several different mechanisms. For example, friction between a ring and each spherical roller can generate thermal energy. The amount of friction and the concomitant thermal energy produced is related to the amount of contact area between the respective spherical roller and the ring(s). In addition, in some instances the lubricating oil itself can also be a factor in the generation of thermal energy. As stated above, a lubricating oil can function as a coolant. However, its ability to act as a coolant is related to its flow rate and the amount of oil present within the bearing cavity at any given point in time. If an excessive volume of oil is present within a bearing cavity, the movement of bearing components within the bearing cavity (typically at a relatively high rotational speed in gas turbine applications) can cause the oil to "churn" within the cavity. In some instances, the churning viscous oil can actually resist the movement of bearing components (producing energy losses) and be a factor in thermal energy development.

Some prior art roller bearings include a bearing outer ring having a plurality of orifices disposed in the center of the outer ring raceway to function as a lubricating oil drain; e.g., see U.S. Pat. Nos. 5,749,660 and 7,384,197. The orifices extend between the raceway and an outer radial surface of the outer ring. There are potential drawbacks to this type of design. For example, in many gas turbine engine designs, an oil film damper is disposed radially outside of the bearing. Outer ring drain orifices exiting the outer radial surface of an outer ring may be incompatible with certain oil film damper designs, or require a modified oil film damper design; e.g., a bifurcated oil film damper design like that disclosed in U.S. Pat. No. 9,841,056, which increases the complexity and cost of the oil film damper. As another example, under extreme radial loads (e.g., that may occur in a fan blade out condition, or an aircraft hard landing scenario, etc.), the rolled element will be driven radially outwardly. If the radial loading is great enough and the outer ring drain apertures are located in the center of the raceway, there is a greater chance of contact and concomitant damage between the roller element and the raceway region adjacent the orifice.

What is needed is a ball bearing with an improved drain hole design which is an improvement over current ball bearing designs.

SUMMARY

According to an aspect of the present disclosure, a bearing assembly having an axially extending axis of rotation is provided. The bearing assembly includes an inner ring, an outer ring, and a plurality of bearing elements. The plurality of bearing elements are disposed between the inner ring and the outer ring. The outer ring includes an outer radial surface, an inner radial surface, and a raceway disposed in the inner radial surface. The raceway is defined by a first surface and a second surface, and the first surface intersects with the second surface at a point aft of an axial midpoint of the raceway. The outer ring includes a plurality of apertures that provide a fluid passage between the raceway and an exterior surface of the outer ring. A first end of each of the plurality of apertures is substantially aligned with the intersection of the first surface and the second surface.

In any of the aspects or embodiments described above and herein, the first surface may include a FS first end disposed at the inner radial surface and an opposite FS second end, the second surface may include a SS first end disposed at the inner radial surface and an opposite SS second end, and the FS second end and the SS second end are disposed at the intersection of the first surface and the second surface.

In any of the aspects or embodiments described above and herein, the FS first end and the SS first end may define a raceway opening that extends a distance between the FS first end and the SS first end, and the axial midpoint of the raceway is disposed at a midpoint between the FS first end and the SS first end.

In any of the aspects or embodiments described above and herein, the first surface may have a parti-circular shape with a first radius and a first origin, and the second surface may have a parti-circular shape with a second radius and a second origin, and the first origin and second origin may be displaced from one another.

In any of the aspects or embodiments described above and herein, the first origin may be positioned a distance axially aft of the second origin.

In any of the aspects or embodiments described above and herein, the first origin may be positioned a distance radially inside of the second origin.

In any of the aspects or embodiments described above and herein, the axial midpoint of the raceway may be disposed at a mean axial position of the first origin and the second origin.

In any of the aspects or embodiments described above and herein, the axial midpoint of the raceway may be defined by a radially extending line that is perpendicular to the inner radial surface, which line is axially disposed midway between the FS first end and the SS first end.

In any of the aspects or embodiments described above and herein, at least one of the first surface or the second surface may have a non-circular arcuate shape.

In any of the aspects or embodiments described above and herein, the non-circular arcuate shape may have more than one radius.

In any of the aspects or embodiments described above and herein, the assembly may include an annular groove disposed in the raceway, substantially aligned with the intersection of the first surface and the second surface, wherein the first end of each of the plurality of apertures is in fluid communication with the annular groove.

In any of the aspects or embodiments described above and herein, the annular groove may extend entirely around a circumference of the outer ring.

In any of the aspects or embodiments described above and herein, at least one of the plurality of apertures may have a second end in fluid communication with an aft surface of the outer ring.

In any of the aspects or embodiments described above and herein, the outer ring may be a unitary body.

According to an aspect of the present disclosure, a bearing assembly is provided that includes an inner ring, and outer ring, and a plurality of bearing elements. The outer ring is disposed radially outside of the inner ring. The outer ring includes an inner radial surface and a raceway disposed in the inner radial surface, and the raceway is defined by a first surface and a second surface. The plurality of bearing elements are disposed between the inner ring and the outer ring, and are at least partially received within the raceway. Each bearing element has a crown point located radially furthest within the raceway. A plurality of apertures disposed within the outer ring, extending between a first end substantially aligned with an intersection of the first surface and the second surface, and a second end disposed at an exterior surface of the outer ring. The crown point of each bearing element is axially misaligned with the intersection of the first surface and the second surface.

In any of the aspects or embodiments described above and herein, the crown point of each bearing element is located axially forward of the intersection of the first surface and the second surface.

In any of the aspects or embodiments described above and herein, the first surface may have a parti-circular shape with a first radius and a first origin, and the second surface may have a parti-circular shape with a second radius and a second origin, and the first origin and second origin are displaced from one another.

In any of the aspects or embodiments described above and herein, the first origin may be positioned a distance axially aft of the second origin.

In any of the aspects or embodiments described above and herein, the first origin may be positioned a distance radially inside of the second origin.

In any of the aspects or embodiments described above and herein, the bearing assembly may include an annular groove disposed in the raceway, substantially aligned with the intersection of the first surface and the second surface, wherein the first end of each of the plurality of apertures are in fluid communication with the annular groove.

The present disclosure, and all its aspects, embodiments and advantages associated therewith will become more readily apparent in view of the detailed description provided below, including the accompanying drawings.

DETAILED DESCRIPTION

Figure 1:
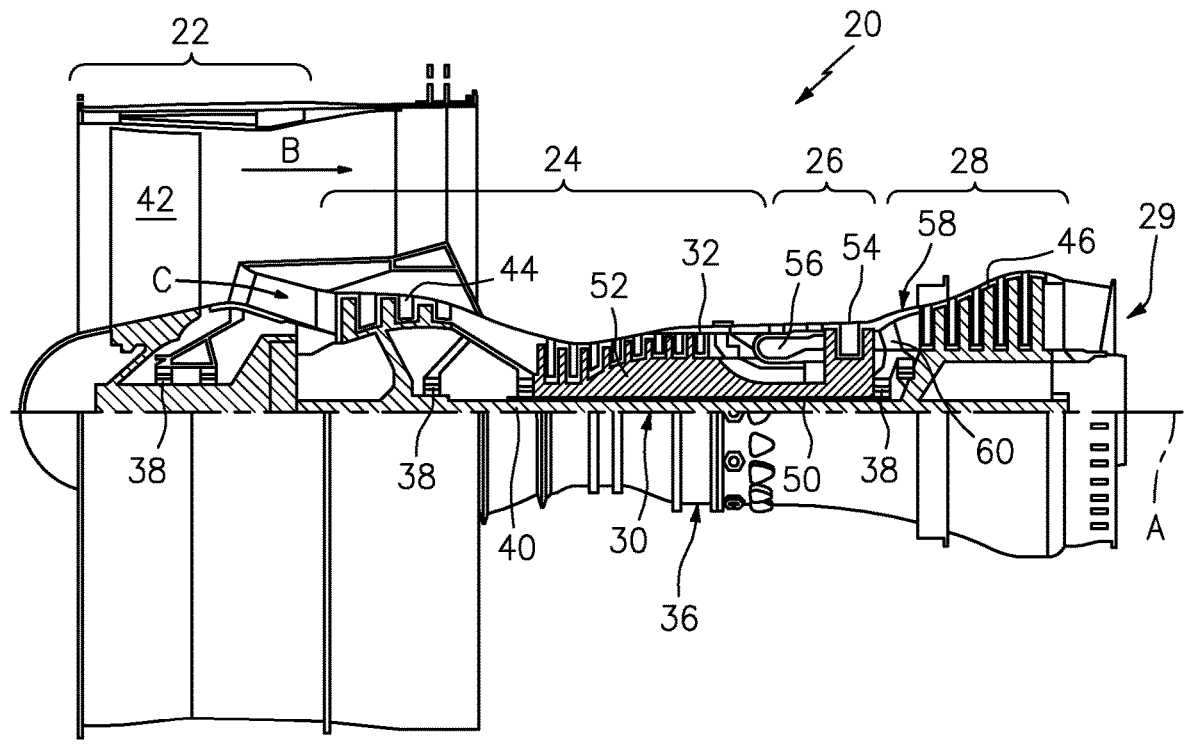
FIG. 1 is a diagrammatic partially sectioned view of a gas turbine engine.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Referring now to FIG. 1, to facilitate the description of the present disclosure a two-spool turbofan type gas turbine engine 20 is shown. This exemplary embodiment of a gas turbine engine includes a fan section 22, a compressor section 24, a combustor section 26, a turbine section 28, a nozzle section 29, and an engine lubrication system in fluid communication with one or more fluid damping structures 68 (e.g., see FIG. 2) and bearings 38. The fan section 22 drives air along a bypass flow path "B" in a bypass duct, while the compressor section 24 drives air along a core flow path "C" for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of machinery with rotating shafts; e.g., a gas turbine engine with a three-spool architecture, a geared turbofan engine, a high speed turbocharger that may be used in an automotive application, or a ground based gas turbine engine application that may be used in a power generation application or a land based vehicle, etc.

The exemplary engine 20 shown in FIG. 1 includes a low speed spool 30 and a high speed spool 32 mounted for rotation about an engine central longitudinal axis "A" relative to an engine static structure 36 via several bearings 38. It should be understood that the location, number, and characteristics of bearings 38 may vary to suit the particular application.

The low speed spool 30 generally includes an inner shaft 40 that interconnects a fan 42, a low pressure compressor 44 and a low pressure turbine 46. The inner shaft 40 may be connected to the fan 42 through a speed change mechanism (e.g., a geared architecture) to drive the fan 42 at a lower speed than the low speed spool 30. The high speed spool 32 includes an outer shaft 50 that interconnects a high pressure compressor 52 and high pressure turbine 54. A combustor 56 is arranged in the exemplary gas turbine engine 20 between the high pressure compressor 52 and the high pressure turbine 54. The inner shaft 40 and the outer shaft 50 are concentric and are rotationally supported via bearings 38 about the engine central longitudinal axis "A" which is collinear with their longitudinal axes. The "forward" end of the engine 20 is the air inlet end of the engine 20, and the "aft" end of the engine 20 is the air exhaust end of the engine 10; e.g., the fan section 22 is disposed at the forward end of the engine 20, and the nozzle section 29 is disposed at the aft end of the engine 20. Unless otherwise specified, a "forward" portion of a component within the engine 20 is subjected to gas traveling through the engine gas flow path prior to an "aft" portion of the aforesaid component.

Figure 2:
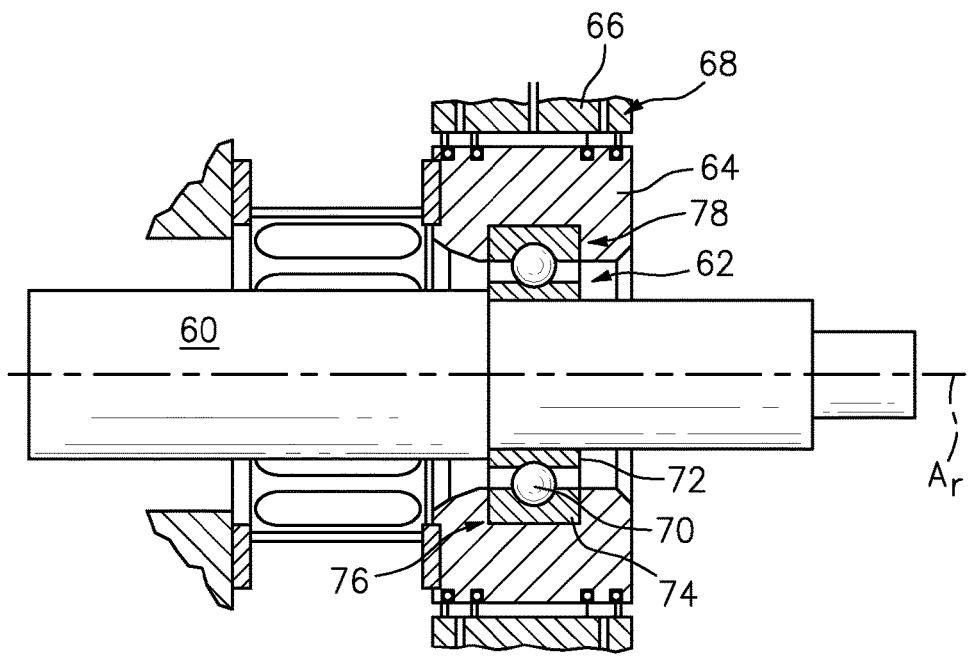
FIG. 2 is a diagrammatic cross-sectional view of a portion of a gas turbine engine showing a bearing compartment with a bearing and a fluid damping structure.

FIG. 2 is a simplified cross-sectional view of a portion of a gas turbine engine. The engine portion includes a rotor shaft 60, a bearing 62, a bearing housing 64, a stator structure 66, and a fluid damping structure 68. The rotor shaft 60 is rotatable about an axis of rotation $A_r$. The bearing 62 includes bearing elements 70, which will be referred to hereinafter as spherical rollers 70, disposed between an inner ring 72 and an outer ring 74. The present disclosure is not limited to bearing elements configured as spherical rollers. The bearing inner ring 72 may be mounted on the rotor shaft 60, and in such embodiments the inner ring 72 rotates with the rotor shaft 60. The bearing outer ring 74 is not fixed with the rotor shaft 60 and does not rotate about the axis of rotation $A_r$. The bearing housing 64 is nonrotating. The bearing outer ring 74 is engaged with an inner radial surface of the bearing housing 64. It should be noted that the geometric configuration of the bearing housing 64 shown in FIG. 2 and described herein is an example of a structure for supporting the bearing 62 and forms a portion of the fluid damping structure 68. The present disclosure is not limited to this particular embodiment; e.g., in some embodiments, the present disclosure may be implemented without a fluid damping structure 68, and/or without a bearing housing 64.

As indicated above, the bearing 62 includes spherical rollers 70 disposed between an inner ring 72 and an outer ring 74. The inner ring 72 and outer ring 74 extend around the circumference of the bearing 62, with the outer ring 74 being disposed radially outside of the inner ring 72. The bearing 62 has an axially extending axis of rotation; e.g., that coincides with the axis of rotation $A_r$. To facilitate the description herein, the bearing 62 may be described as having a forward end 76 and an aft end 78. When mounted within a gas turbine engine 20, for example, the forward end 76 of the bearing 62 is disposed axially forward of the aft end 78.

Figure 3:
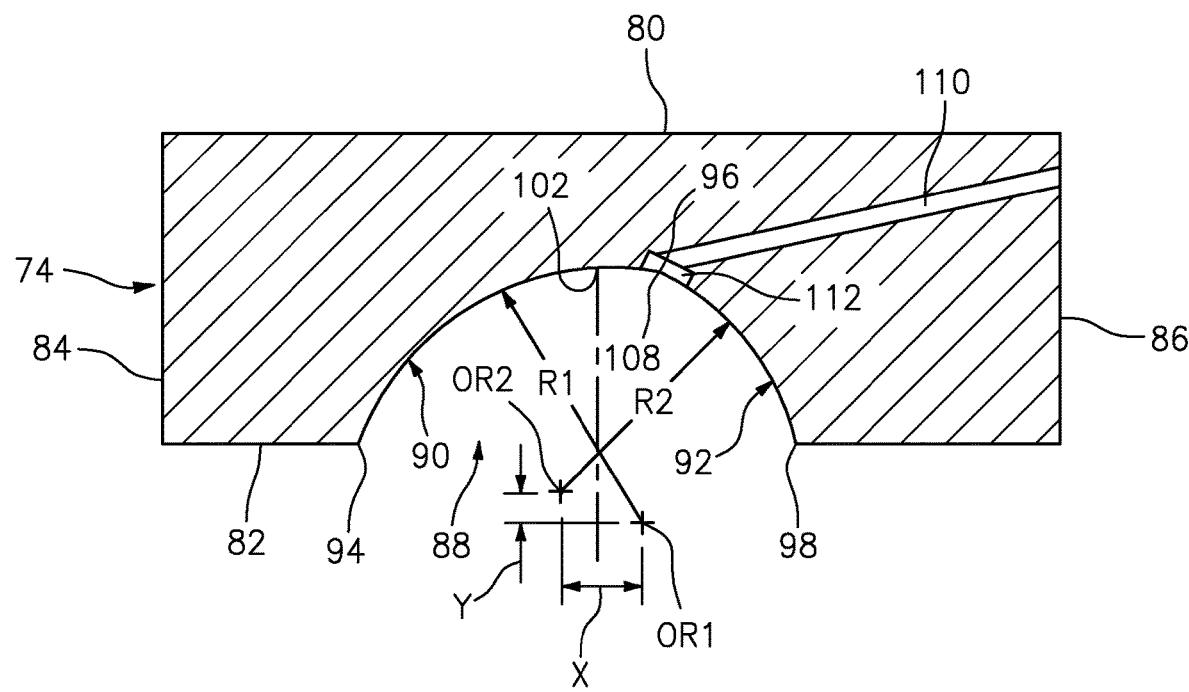
FIG. 3 is a diagrammatic partial sectioned view of an outer ring embodiment.
Figure 4:
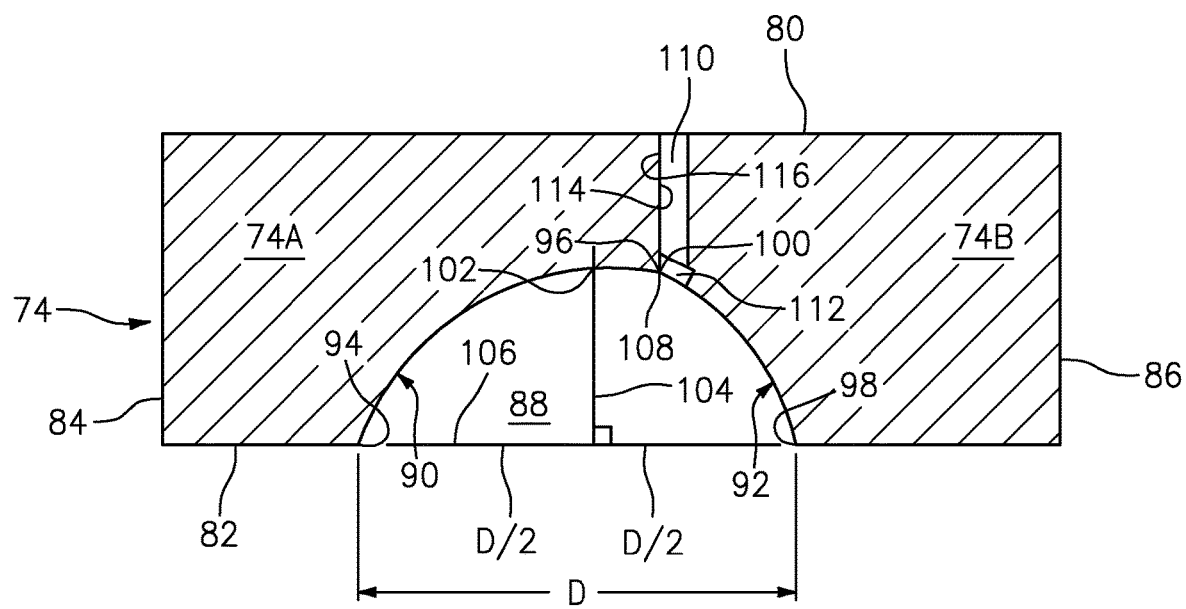
FIG. 4 is a diagrammatic partial sectioned view of an outer ring embodiment.

Referring to FIGS. 3 and 4, the outer ring 74 includes an outer radial surface 80, an inner radial surface 82, a forward surface 84 and an aft surface 86. The forward and aft surfaces 84, 86 extend between the outer radial surface 80 and the inner radial surface 82. The outer ring 74 embodiments shown in FIGS. 3-7 are shown diagrammatically as having a generally rectangularly shaped cross-section. The present disclosure is not limited to an outer ring 74 having a rectangularly shaped cross-section.

The outer ring 74 includes a raceway 88 disposed in the inner radial surface 82. In some embodiments the outer ring 74 may be a unitary body. In other embodiments, the outer ring 74 may be collectively formed from a first portion 74A and a second portion 74B (e.g., see FIG. 4). The raceway 88 extends around the circumference of the inner radial surface 82. The raceway 88 is configured to receive a portion of the spherical rollers 70. The raceway 88 may be defined by a first surface 90 and a second surface 92. A first end 94 of the first surface 90 ("FS first end 94") intersects with the inner radial surface 82, and an opposite second end 96 of the first surface 90 ("FS second end 96") intersects with the second surface 92. A first end 98 of the second surface 92 ("SS first end 98") intersects with the inner radial surface 82, and an opposite second end 100 of the second surface 92 ("SS second end 100") intersects with the first surface 90.

In some embodiments (e.g., like that shown diagrammatically in FIG. 4 wherein the inner radial surface 82 is planar), the first end 94 of the first surface 90 and the first end 98 of the second surface 92 define the opening of the raceway 88 at the inner radial surface 82 of the outer ring 74. The distance "D" between the first end 94 of the first surface 90 and the first end 98 of the second surface 92 may be referred to as the axial length of the raceway opening at the inner radial surface 82. The axial midpoint 102 of the raceway 88 may be defined by a first line 104 extending perpendicular to a second line 106, which second line 106 extends across the opening of the raceway 88 at the inner radial surface 82. The first line 104 is positioned at the midpoint between the first end 94 of the first surface 90 and the first end 98 of the second surface 92; i.e., at D/2. The intersection 108 of the first surface 90 and the second surface 92 is displaced from the midpoint 102 of the raceway 88. In the embodiments shown in FIGS. 3-7, the intersection 108 of the first surface 90 and the second surface 92 is located aft of the midpoint 102 of the raceway 88.

Figure 4A:
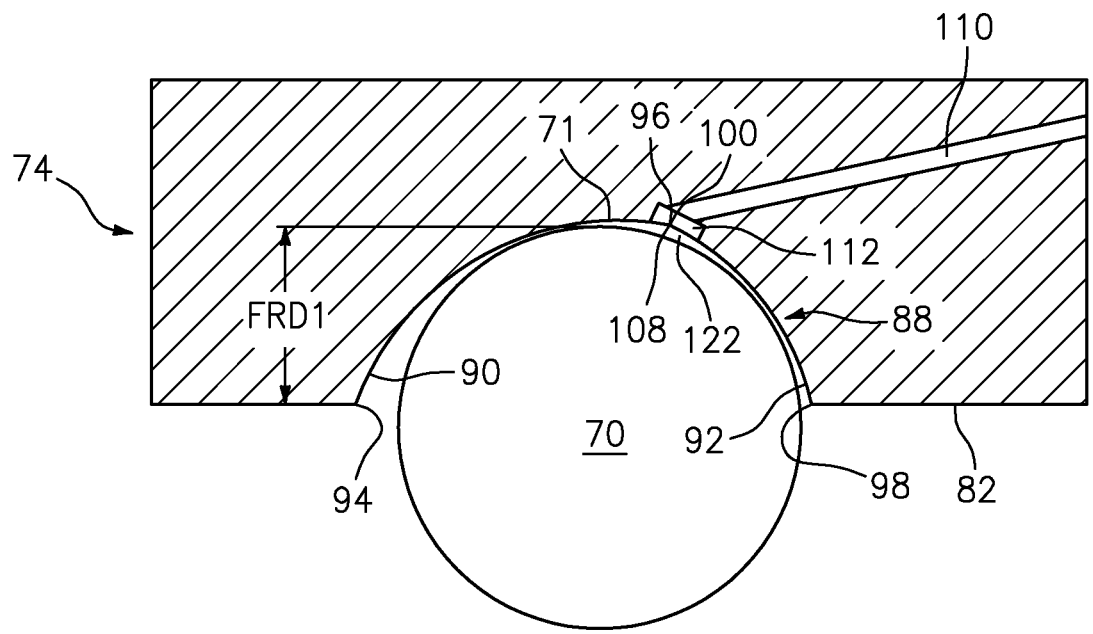
FIG. 4A is a diagrammatic partial sectioned view of an outer ring embodiment.
Figure 4B:
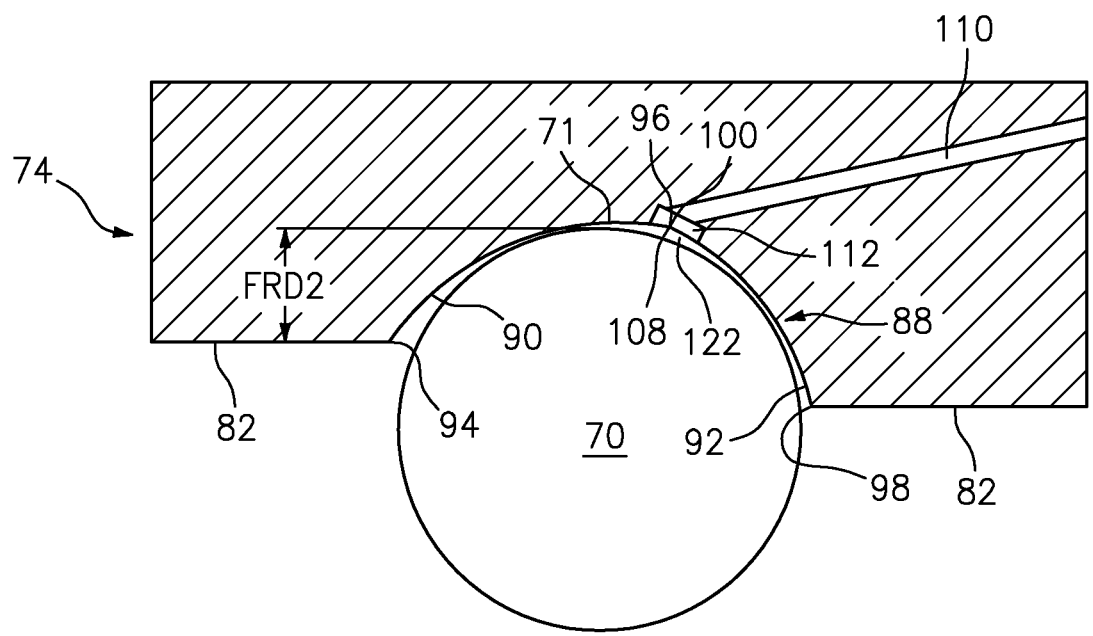
FIG. 4B is a diagrammatic partial sectioned view of an outer ring embodiment.
Figure 5:
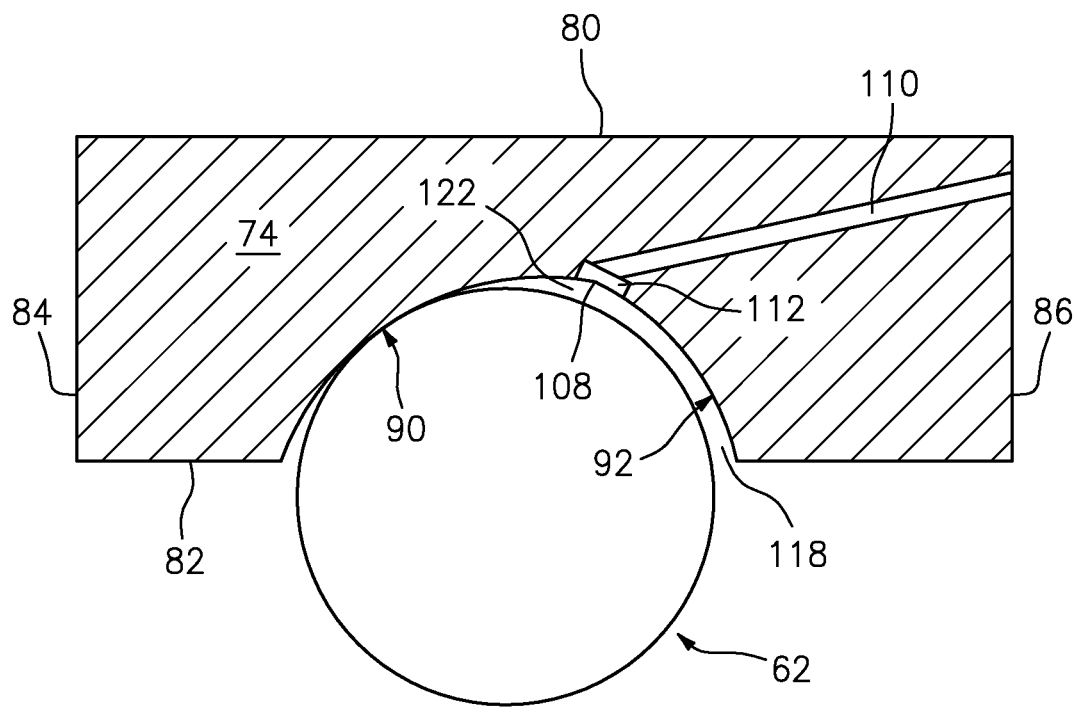
FIG. 5 is a diagrammatic partial view of a bearing embodiment, showing an outer ring and a spherical roller.
Figure 6:
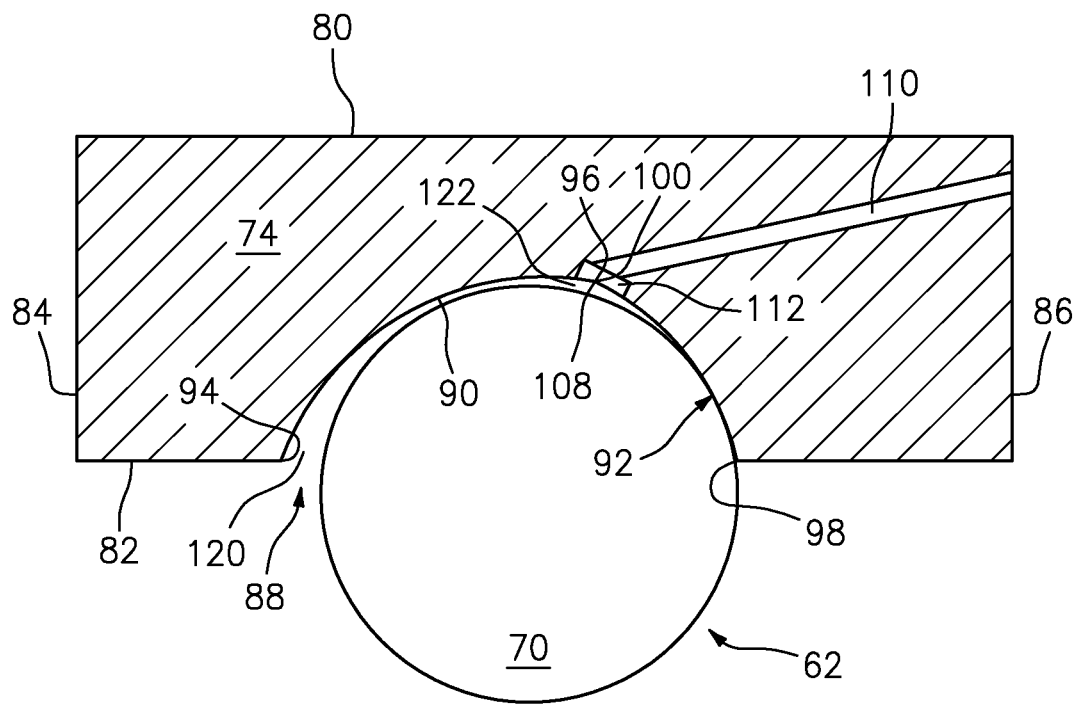
FIG. 6 is a diagrammatic partial view of a bearing embodiment, showing an outer ring and a spherical roller.

Alternatively, the position of the intersection 108 of the first and second surfaces 90, 92 within the raceway 88 (and therefore the position of the apertures 110 engaging the raceway 88, and/or the position of the groove 112 within the raceway 88 as will be explained below) may be defined in terms of the relative positions of the raceway 88 and the spherical roller 70. As explained below, the position of a spherical roller 70 relative to the raceway surfaces (first and second surfaces 90, 92) may vary during different operational modes. In all operational modes, however, the spherical roller 70 will have a surface point (e.g., a crown point 71—see FIGS. 4A and 4B) that is located the furthest radial distance within the raceway 88; e.g., the surface point of the roller 70 that is located at the furthest radial distance from the rotational axis of the bearing, regardless of whether the spherical roller 70 has a single point of contact with the raceway 88 or has more than one point of contact with the raceway 88 (e.g., two points of contact). The intersection 108 of the first surface 90 and the second surface 92 is axially misaligned with (e.g., located axially aft of) the crown point 71 of the spherical rollers 70. FIG. 4A diagrammatically illustrates an outer ring 74 having a planar inner radial surface 82 and a spherical roller 70 with a crown point 71 located axially forward of the intersection 108 of the first and second surfaces 90, 92 within the raceway 88. The radial position of the crown point 71 in FIG. 4A is illustrated by furthest radial distance "FRD1" taken from the planar inner radial surface 82. FIG. 4B diagrammatically illustrates an outer ring 74 having a non-planar inner radial surface 82 and a spherical roller 70 with a crown point 71 located axially forward of the intersection 108 of the first and second surfaces 90, 92 within the raceway 88. The radial position of the crown point 71 in FIG. 4B is illustrated by furthest radial distance "FRD2" taken from a forward portion of the non-planar inner radial surface 82. The present disclosure is not limited to any particular methodology of determining the position of the crown point 71 of a spherical roller 70 within the raceway 88.

In some embodiments, the first surface 90 may be a parti-circular shaped surface having a radius R1. In some embodiments, the second surface 92 may be a parti-circular shaped surface having a radius R2. The term "parti-circular" as used herein means that the surface is disposed at a given radius for a segment of travel about an origin. In the embodiment shown in FIG. 3, the first surface 90 is disposed at radius R1 and radius R1 has an origin of OR1 and the second surface 92 is disposed at radius R2 and radius R2 has an origin of OR2. The position of the origin OR1 is displaced from the position of the origin OR2. For example, as can be seen in FIG. 3 the origin OR1 is positioned a distance "X" axially aft of origin OR2, and positioned a distance "Y" radially inside of origin OR2 (i.e., the radial distance between OR1 and the bearing axis of rotation is less than the radial distance between OR2 and the bearing axis of rotation). The present disclosure is not limited to the embodiment shown in FIG. 3. As another non-limiting example, the origin OR1 may be positioned a distance "X" axially aft of origin OR2, both OR1 and OR2 may be positioned at the same radial position (e.g., "Y"=0), and R1 and R2 may not be equal one another (R1≠R2). In some embodiments, the length of radius R1 may be equal to the length of radius R2 (i.e., R1=R2). In some embodiments, the length of radius R1 may be greater than or lesser than the length of radius R2 (i.e., R1 R2). The positioning of the origins OR1, OR2 and the lengths of the surface radii R1, R2, are such that the intersection 108 of the first surface 90 and the second surface 92 is displaced from the midpoint 102 of the raceway 88; e.g., aft of the midpoint 102 of the raceway 88. In some embodiments wherein the first surface 90 is disposed at radius R1 and radius R1 has an origin of OR1 and the second surface 92 is disposed at radius R2 and radius R2 has an origin of OR2, the midpoint 102 of the raceway 88 may be defined as the mean axial position of the two origins OR1, OR2.

Figure 8:
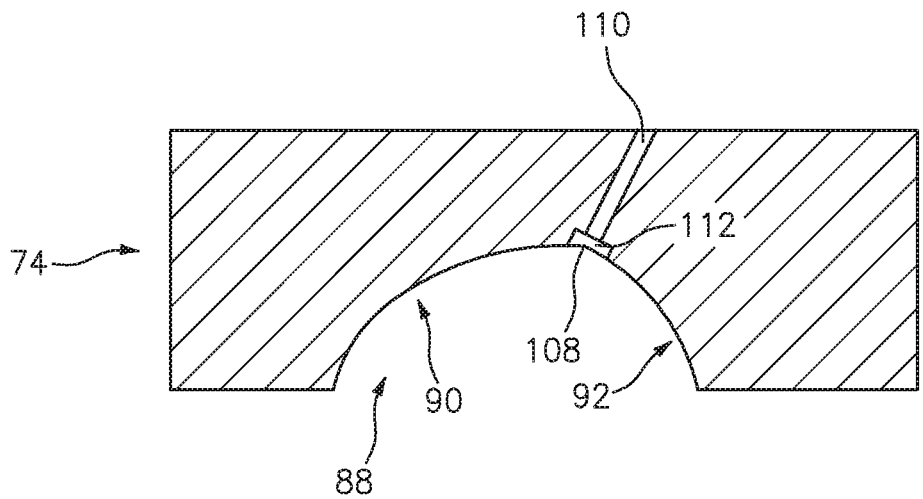
FIG. 8 is a diagrammatic partial sectioned view of an outer ring embodiment.
Figure 9:
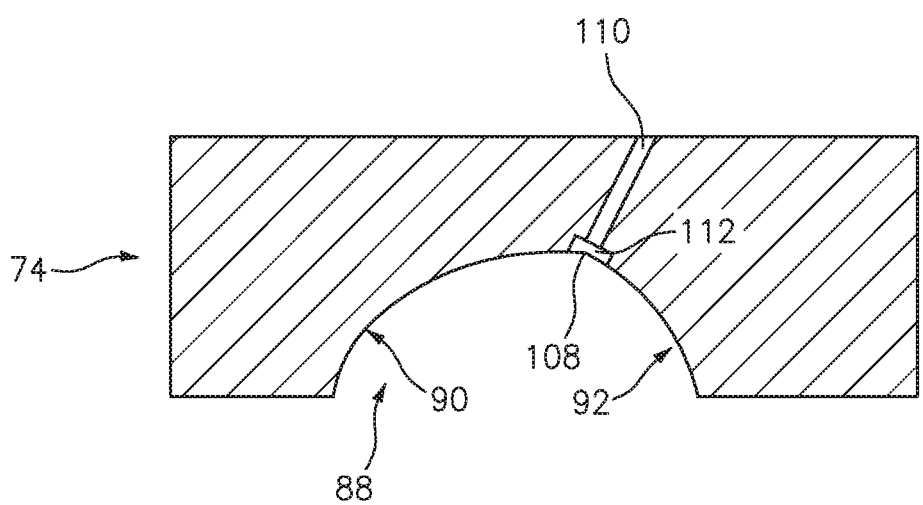
FIG. 9 is a diagrammatic partial sectioned view of an outer ring embodiment.

The first surface 90 and/or the second surface 92 of the raceway 88 are not limited to a parti-circular shape. In alternative embodiments first surface 90 and/or the second surface 92 may have an arcuate shape; e.g., a curved surfaces having more than one radius (e.g., See FIG. 8), or a complex curvilinear surface (e.g., See FIG. 9), etc.

As will be discussed in greater detail below, the first surface 90 and the second surface 92 are configured such that during modes of operation each spherical roller 70 may only contact one point of the raceway 88, and under other operating conditions each spherical roller 70 may contact two points of the raceway.

The outer ring 74 includes one or more apertures 110 disposed at, or in close proximity to, the intersection 108 between the first surface 90 and the second surface 92. The one or more apertures 110 extend from the raceway 88 to an exterior surface of the outer ring 74; e.g., to the outer radial surface 80, or the aft surface 86, or both (some apertures 110 to the outer radial surface 80, some to the aft surface 86, etc.). The one or more apertures 110 are configured to provide a fluid passage through which oil may drain from the raceway 88, and the bearing cavity in general. The one or more apertures 110 may be spaced around the circumference of the raceway 88. In some embodiments, the outer ring 74 may include an annular groove 112 that extends entirely around the circumference of the raceway 88, located at, or in close proximity to, the intersection 108 between the first surface 90 and the second surface 92. In these embodiments, the one or more apertures 110 intersect with the annular groove 112 and thereby provide a fluid passage (i.e., fluid communication) between the groove 112 and the exterior surface. In some embodiments, the annular groove 112 may not be continuous around the entire circumference, but may for example include a plurality of groove segments, each extending a partial distance of the circumference of the raceway 88. In those embodiments having a circumferentially extending annular groove 112, the first surface 90 and the second surface 92 may not, strictly speaking, intersect with one another by virtue of the annular groove 112 being disposed at the aforesaid intersection 108. In these instances, the intersection 108 of the first surface 90 and the second surface 92 may be considered to be the point where the respective curvatures of the first and second surfaces 90, 92 would have met but for the annular groove 112.

Figure 7:
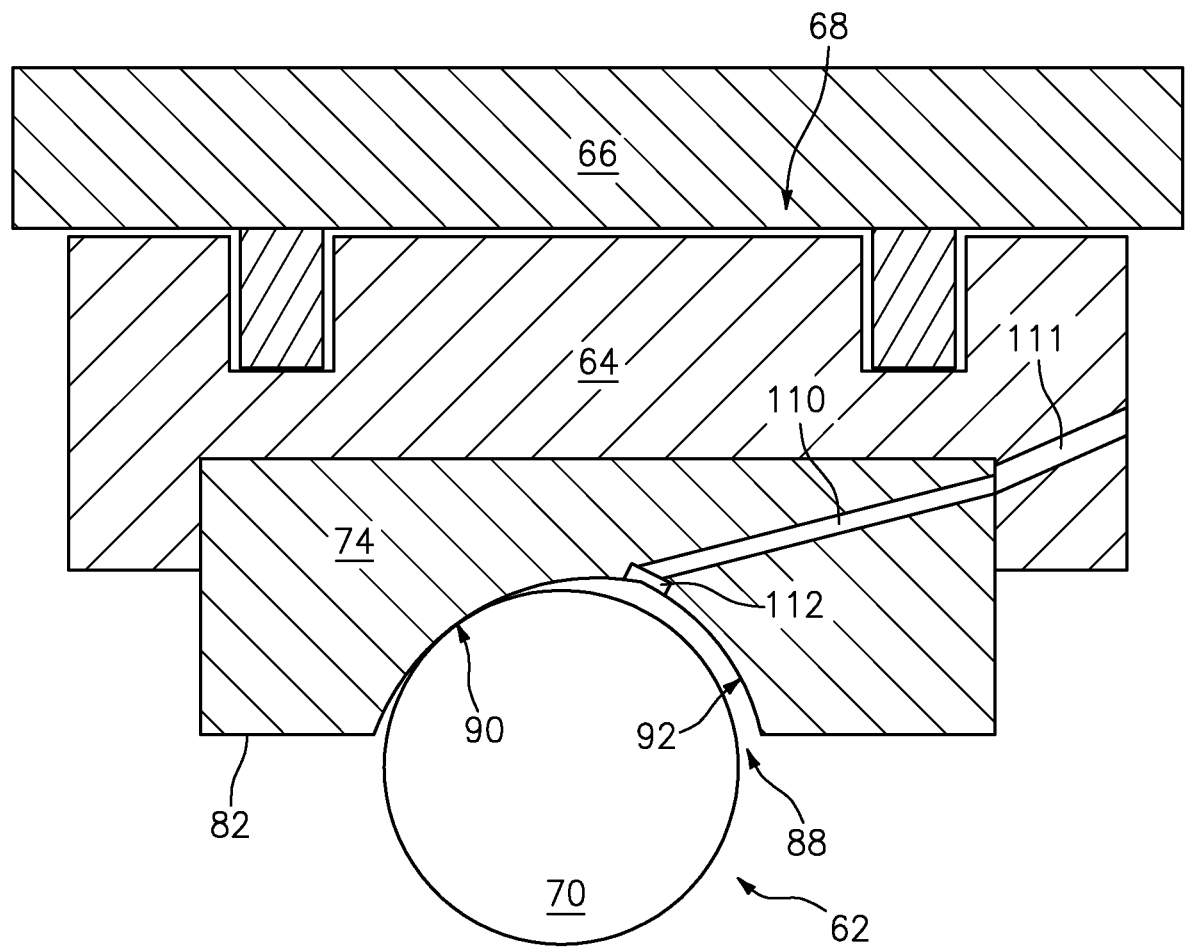
FIG. 7 is a diagrammatic partial view of a bearing embodiment with an outer ring and a spherical roller, coupled with a bearing housing and a fluid damping structure.

The positioning of the one or more apertures 110 displaced from the midpoint 102 of the raceway 88 (e.g., extending from the raceway 88 to an exterior surface of the outer ring 74 such as the outer radial surface, or the aft surface 86, etc.) provides improved options regarding the oil drainage paths. For example, as shown in FIG. 7, in some applications a bearing 62 may be disposed proximate a bearing housing 64 that forms a portion of a fluid damping structure 68. As can be seen in FIG. 7, in such an application the one or more apertures 110 and the oil drainage path they provide can be oriented to extend aftward and thereby avoid the fluid damping structure 68. In the embodiment shown in FIG. 7, the one or more apertures 110 are aligned with apertures 111 disposed within the bearing housing 64.

In those embodiments wherein the outer ring 74 is collectively formed from a first portion 74A and a second portion 74B (e.g., see FIG. 4), the first portion 74A has a first mating surface 114 and the second portion 74B has a second mating surface 116. When the bearing 62 is assembled, the first and second mating surfaces 114, 116 are positioned contiguous with one another to form the outer ring 74. In these embodiments, the one or more apertures 110 disposed at, or in close proximity to, the intersection 108 between the first surface 90 and the second surface 92, may be formed at the interface of the first mating surface 114 and the second mating surface 116. For example, one or more grooves may be formed in the first mating surface 114, or in the second mating surface 116, or in both the first and second mating surfaces 114, 116, or partially in each of the first and second mating surfaces 114, 116. When the bearing 62 is assembled and the first and second mating surfaces 114, 116 are contiguous with one another, the aforesaid grooves form the one or more apertures 110.

As indicated above, the first surface 90 and the second surface 92 may be configured such that during some operational modes each spherical roller 70 only contacts one point in the raceway 88, which point lies within the first surface 90. The single point of contact between each spherical roller 70 and the raceway 88 may result in less thermal energy being generated, which in turn decreases the amount of thermal energy that needs to be removed via cooling. Under some operating conditions, however, the bearing 62 will almost always be subjected to a load that includes an axial component and a radial component. As stated above, under some operational modes, the axial component will cause each spherical roller 70 to again contact only a single point of the raceway 88 (e.g., a point that lies within the first surface 90, see FIG. 5) and will position each spherical roller 70 so that there is a clearance gap 118 between the spherical roller 70 and the second surface 92 of the raceway 88, which clearance gap 118 provides an oil exit passage to the one or more apertures 110 (and/or the circumferentially extending annular groove 112). In contrast, under an operational mode in which a sufficient axial load reversal occurs, the now reversed axial component may cause each spherical roller 70 to contact only a single point of the raceway 88 (e.g., a point that lies within the second surface 92, see FIG. 6). In this position, each spherical roller 70 is positioned so that there is a clearance gap 120 between the spherical roller 70 and the first surface 90 of the raceway 88, which clearance gap 120 provides an oil exit passage to the one or more apertures 110 (and/or the circumferentially extending annular groove 112). Regardless of the axial loading, the raceway 88 (and in particular the first and second surfaces 90, 92) is configured such that there is always an annular void 122 created between each spherical roller 70 and the one or more apertures 110 (and/or the circumferentially extending annular groove 112) disposed at, or in close proximity to, the intersection 108 between the first surface 90 and the second surface 92. Hence, the raceway 88 is configured to avoid contact between each spherical roller 70 and the one or more apertures 110 (and/or the circumferentially extending annular groove 112). The avoidance of such contact decreases or eliminates the chance of contact between a spherical roller 70 and an edge of the aperture 110 or annular groove 112, as well as the possibility of any spalling (or other wear or damage) that might otherwise occur as a result of such contact.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A bearing assembly having an axially extending axis of rotation, comprising:
   an inner ring;
   an outer ring including an outer radial surface, an inner radial surface, and a raceway disposed in the inner radial surface, the raceway defined by a first surface (FS) and a second surface (SS), and the first surface intersects with the second surface at a point aft of an axial midpoint of the raceway, the outer ring including a plurality of apertures that provide a fluid passage between the raceway and an exterior surface of the outer ring, a first end of each of the plurality of apertures substantially aligned with the intersection of the first surface and the second surface; and
   a plurality of bearing elements disposed between the inner ring and the outer ring;
   wherein the first surface includes a FS first end disposed at the inner radial surface and an opposite FS second end, the second surface includes a SS first end disposed at the inner radial surface and an opposite SS second end, wherein the FS second end and the SS second end are disposed at the intersection of the first surface and the second surface; and
   wherein the FS first end and the SS first end define a raceway opening that extends a distance between the FS first end and the SS first end, and the axial midpoint of the raceway is disposed at a midpoint between the FS first end and the SS first end; and
   wherein the first surface has a parti-circular shape with a first radius and a first origin, and the second surface has a parti-circular shape with a second radius and a second origin, and the first origin and second origin are displaced from one another.

2. The bearing assembly of claim 1, wherein the first origin is positioned a distance axially aft of the second origin.

3. The bearing assembly of claim 2, wherein the first origin is positioned a distance radially inside of the second origin.

4. The bearing assembly of claim 3, wherein the axial midpoint of the raceway is disposed at a mean axial position of the first origin and the second origin.

5. The bearing assembly of claim 1, wherein the axial midpoint of the raceway is defined by a radially extending line that is perpendicular to the inner radial surface, which line is axially disposed midway between the FS first end and the SS first end.

6. The bearing assembly of claim 1, wherein at least one of the plurality of apertures has a second end in fluid communication with an aft surface of the outer ring.

7. The bearing assembly of claim 1, wherein the outer ring is a unitary body.

8. A bearing assembly having an axially extending axis of rotation, comprising:
   an inner ring;
   an outer ring including an outer radial surface, an inner radial surface, and a raceway disposed in the inner radial surface, the raceway defined by a first surface (FS) and a second surface (SS), and the first surface intersects with the second surface at a point aft of an axial midpoint of the raceway, the outer ring including a plurality of apertures that provide a fluid passage between the raceway and an exterior surface of the outer ring, a first end of each of the plurality of apertures substantially aligned with the intersection of the first surface and the second surface; and
   a plurality of bearing elements disposed between the inner ring and the outer ring;
   wherein the first surface includes a FS first end disposed at the inner radial surface and an opposite FS second end, the second surface includes a SS first end disposed at the inner radial surface and an opposite SS second end, wherein the FS second end and the SS second end are disposed at the intersection of the first surface and the second surface; and
   wherein the FS first end and the SS first end define a raceway opening that extends a distance between the FS first end and the SS first end, and the axial midpoint of the raceway is disposed at a midpoint between the FS first end and the SS first end; and
   wherein at least one of the first surface or the second surface has a non-circular arcuate shape.

9. The bearing assembly of claim 8, wherein the non-circular arcuate shape has more than one radius.

10. A bearing assembly having an axially extending axis of rotation, comprising:
    an inner ring;
    an outer ring including an outer radial surface, an inner radial surface, and a raceway disposed in the inner radial surface, the raceway defined by a first surface and a second surface, and the first surface intersects with the second surface at a point aft of an axial midpoint of the raceway, the outer ring including a plurality of apertures that provide a fluid passage between the raceway and an exterior surface of the outer ring, a first end of each of the plurality of apertures substantially aligned with the intersection of the first surface and the second surface; and a plurality of bearing elements disposed between the inner ring and the outer ring;

wherein an annular groove is disposed in the raceway, substantially aligned with the intersection of the first surface and the second surface, wherein the first end of each of the plurality of apertures is in fluid communication with the annular groove.

11. The bearing assembly of claim 10, wherein the annular groove extends around a circumference of the outer ring.

12. A bearing assembly, comprising:

an inner ring;

an outer ring disposed radially outside of the inner ring, the outer ring including an inner radial surface and a raceway disposed in the inner radial surface, the raceway defined by a first surface and a second surface;

a plurality of bearing elements disposed between the inner ring and the outer ring, the plurality of bearing elements disposed at least partially within the raceway and each having a crown point located radially furthest within the raceway; and a plurality of apertures disposed within the outer ring, extending between a first end substantially aligned with an intersection of the first surface and the second surface, and a second end disposed at an exterior surface of the outer ring, wherein the crown point of each bearing element is axially misaligned with the intersection of the first surface and the second surface;

wherein the crown point of each bearing element is located axially forward of the intersection of the first surface and the second surface; and wherein the first surface has a parti-circular shape with a first radius and a first origin, and the second surface has a parti-circular shape with a second radius and a second origin, and the first origin and second origin are displaced from one another.

13. The bearing assembly of claim 12, wherein the first origin is positioned a distance axially aft of the second origin.

14. The bearing assembly of claim 13, wherein the first origin is positioned a distance radially inside of the second origin.

15. The bearing assembly of claim 12, further comprising an annular groove disposed in the raceway, substantially aligned with the intersection of the first surface and the second surface, wherein the first end of each of the plurality of apertures are in fluid communication with the annular groove.

* * * * *